United States Patent [19]

Murakami et al.

[11] Patent Number: 5,758,268
[45] Date of Patent: May 26, 1998

[54] TRANSMITTER

[75] Inventors: Yoshihiro Murakami; Yasuaki Tomiyama, both of Kanagawa, Japan

[73] Assignee: Sony Corporation, Tokyo, Japan

[21] Appl. No.: 743,371

[22] Filed: Nov. 4, 1996

[30] Foreign Application Priority Data

Nov. 7, 1995 [JP] Japan .................. 7-313524

[51] Int. Cl.$^6$ .................................. H04B 1/04
[52] U.S. Cl. .................. 455/114; 455/91; 375/296
[58] Field of Search ...................... 455/91, 95, 108, 455/110, 111, 112, 113, 114, 115, 116, 127, 42, 63; 375/238, 239, 284, 285, 295, 296

[56] References Cited

U.S. PATENT DOCUMENTS

| 4,370,622 | 1/1983 | Hornbeck et al. ............. 455/116 |
| 4,811,422 | 3/1989 | Kahn ............................ 455/114 |
| 5,077,831 | 12/1991 | Weber ........................... 455/114 |

FOREIGN PATENT DOCUMENTS

| 401273462 | 11/1989 | Japan ........................... 375/296 |

*Primary Examiner*—Reinhard J. Eisenzopf
*Assistant Examiner*—Thanh Le
*Attorney, Agent, or Firm*—Frommer Lawrence & Haug LLP; William S. Frommer

[57] ABSTRACT

In a microphone, unnecessary radiation can be easily reduced with a simple construction. This invention provides a power supply output generating means for generating a power supply output of predetermined voltage on the basis of an output of a power supply unit; a tone signal generating means for operating according to the output of the power supply unit and generating a tone signal; a sound electric signal converting means for converting a sound into an electric signal; a mixing means for mixing the sound signal obtained by the sound electric signal converting means and the tone signal; a modulating means for modulating a carrier wave with a low frequency signal consisting of the sound signal and tone signal which are mixed by the mixing means; and a transmitting means for transmitting modulated wave signal modulated by the modulating means in an electric wave, and wherein the tone signal generating means generates the tone signal having predetermined frequency and predetermined frequency deviation such as not to extend across predetermined frequency bandwidth of the carrier wave, and the voltage generating means generates the power supply output of predetermined voltage on the basis of the output of the power supply unit by using the tone signal as a clock.

3 Claims, 3 Drawing Sheets

TRANSMITTER

BACKGROUND OF THE INVENTION

1. Field Of The Invention

This invention relates to a transmitter, and more particularly, is applicable to a portable microphone having wireless system.

2. Description Of The Related Art

In a portable microphone having wireless system, for example, a dry battery is used as power supply. If the dry battery is used just as normal voltage, the phenomenons such as the reduction of output voltage and the lowering of dynamic range have been occurred when voltage drop arose.

Consequently, to prevent the reduction of output voltage and the lowering of dynamic range, it is needed that the voltage of the dry battery is converted into predetermined DC voltage for starting the microphone (for example, a microphone which starts with 5 [V] voltage by using 3 [V] dry battery as power supply). Therefore, in a microphone, a DC—DC converter (a DC transforming device) having the PWM (Pulse Width Modulation) scheme, which uses oscillation frequency 100 to 180 [KHz] by an internal oscillating circuit, is used for obtaining the predetermined DC voltage. In actual, in the DC—DC converter, a pulse width modulation is carried out by the internal oscillating circuit, for example, with oscillation frequency 100 [KHz].

By the way, in the microphone having the above construction, the DC—DC converter generates the predetermined DC voltage on the basis of the oscillation frequency 100 [KHz] by the internal oscillating circuit, the selected oscillation frequency 100 [KHz] is superimposed on a carrier wave through the power supply line or by leakage flux.

For example, as shown in FIG. 1, in the case where the switching frequency of fundamental wave by the oscillating circuit in the DC—DC converter is 100 [KHz] on assuming that a channel period of the transmitter and receiver is 250 [KHz], the fundamental wave is superimposed on the carrier wave. Therefore, there are problems that the second higher harmonic (200 [KHz]) and the third higher harmonic (300 [KHz]) of the fundamental wave have an influence by extending to the occupied bandwidth of the channels adjacent to the right or left of them, and the second and third higher harmonic waves become interference radiowave on receiver.

As described above, in the microphone, since unnecessary oscillation frequency 100 [KHz] is superimposed on the carrier wave through the power supply line from the DC—DC converter, a filter has to be provided for reducing the oscillation frequency. However, on the circuit construction of the microphone, the filter is restricted because of limitation in the size of substrate, therefore, there is a problem that a frequency component which cannot be reduced by the filter is occurred as unnecessary radiation (spurious) because of being superimposed on the carrier wave.

SUMMARY OF THE INVENTION

In view of the foregoing, an object of this invention is to provided a transmitter in which unnecessary radiation can be reduced with a simple construction.

The foregoing objects and other objects of the invention have been achieved by the provision of transmitter, which comprises that: a power supply output generating means for generating a power supply output of predetermined voltage on the basis of an output of a power supply unit; a tone signal generating means for operating according to the output of the power supply unit and generating a tone signal; a sound electric signal converting means for converting a sound into electric signal; a mixing means for mixing the sound signal obtained by the sound electric signal converting means and the tone signal; a modulating means for modulating a carrier wave with a low frequency signal consisting of the sound signal and the tone signal which are mixed by the mixing means; and a transmitting means for transmitting modulated wave signal modulated by the modulating means in electric wave; and in which the tone signal generating means generates the tone signal having predetermined frequency and predetermined frequency deviation such as not to extend across predetermined frequency bandwidth of the carrier wave and the power supply output generating means generates the power supply output of predetermined voltage on the basis of the output of the power supply unit by using the tone signal as a clock.

Thus, by using the tone signal of predetermined frequency and predetermined frequency deviation such as not to extend across predetermined occupied bandwidth by the tone signal generating means as a clock of the power supply output generating means, the transmitter can own the tone signal generating means jointly and unnecessary radiation can be reduced without an effect to adjacent channels for the reason that the level of multi-higher harmonic component is extremely low even if the frequency component of the tone signal is superimposed on the carrier wave.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
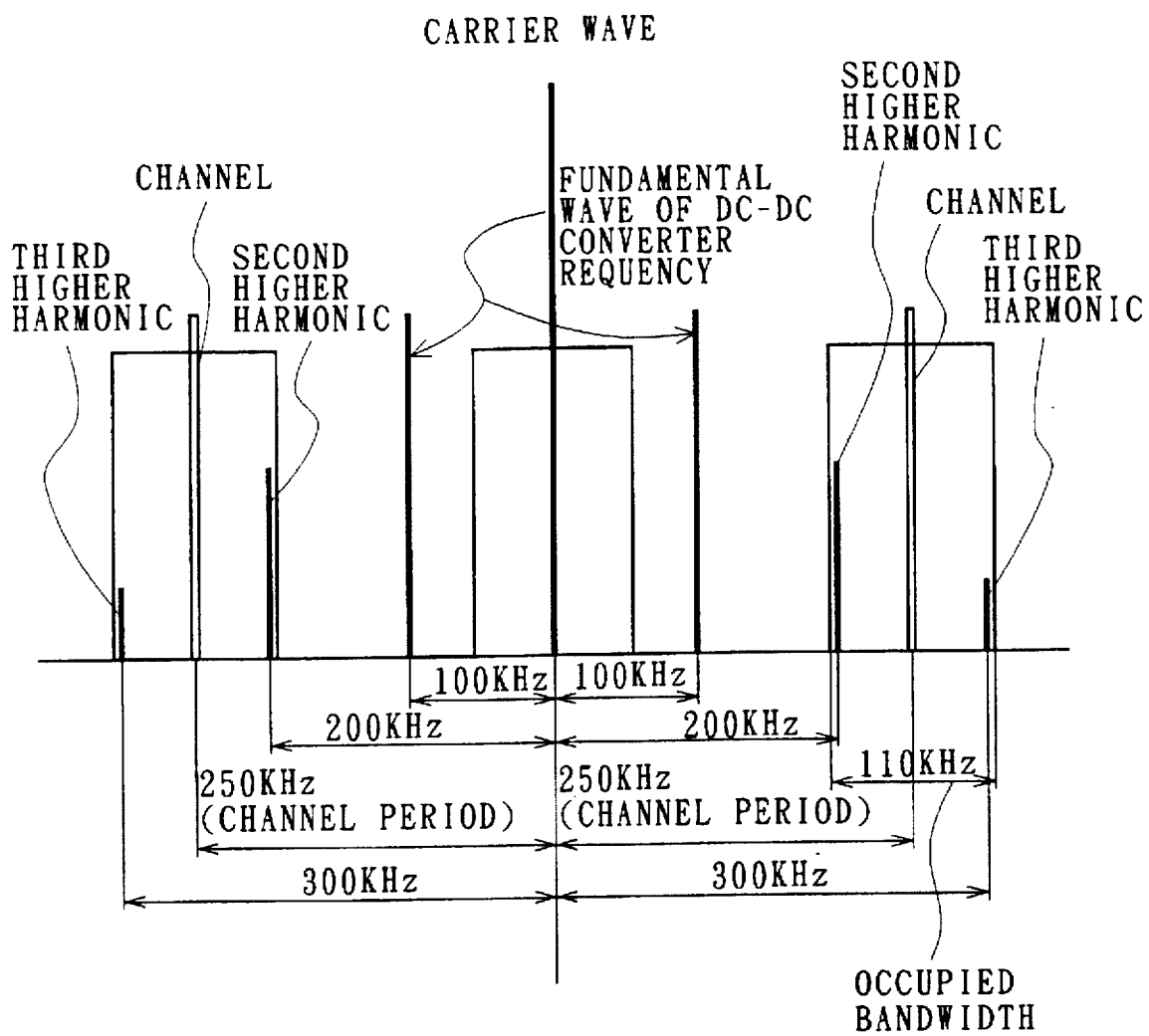
FIG. 1 is a schematic diagram showing the relation between carrier wave and higher harmonic according to the prior art.
Figure 2:
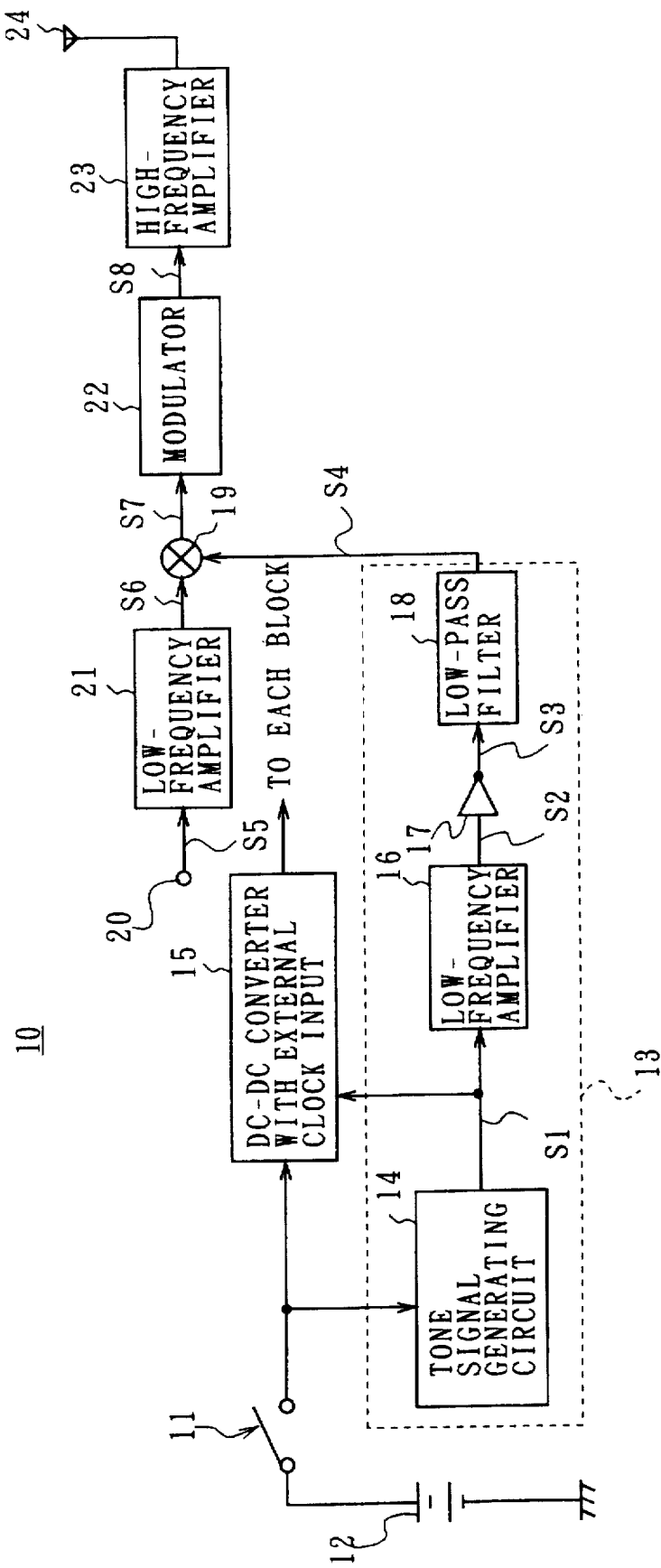
FIG. 2 is a block diagram showing the construction of a microphone containing a tone signal generating circuit according to the present invention.

Preferred embodiment of this invention will be described with reference to the accompanying drawings:

In FIG. 2, numeral 10 shows the construction of a portable microphone having FM modulation system, and when a power supply switch 11 is turn ON, a tone signal generating circuit 14 in a tone signal generating section 13 is started as a tone signal generating means on the basis of an output supplied from a power supply unit 12.

The tone signal generating circuit 14 supplies a tone signal S1 of 32 [KHz] to a DC—DC converter with external clock input 15 being a power supply output generating means, and also supplies the tone signal S1 to a low-frequency amplifier 16.

By using the tone signal S1 of 32 [KHz] as a clock, The DC—DC converter with external clock input 15 can generate a power supply output of predetermined voltage by performing pulse width modulation based on the output supplied from the power supply unit 12. Therefore, the microphone 10 can starts each block (not shown) by using the power supply output of the predetermined voltage generated by the DC—DC converter with external clock input 15.

At this point, the tone signal S1 is a signal for preventing unnecessary sound signal from being output without opening a squelch circuit (not shown) even if a receiver receives unnecessary higher frequency signal during waiting for receiving. That is, the tone signal S1 superimposes a fundamental wave on the carrier wave. The fundamental wave has a frequency such as not to extend across predetermined occupied bandwidth of the carrier wave and is predetermined frequency deviation, and also does not contain a frequency of audio frequency band, for example, a frequency of 32 [KHz].

At this point, it is assumed that the maximum of the sound signal frequency is "fmax" and the frequency deviation of the tone signal S1 is "$\Delta f$", the occupied bandwidth "B" is represented by the following equation.

$$B=2(fmax+\Delta f) \qquad (1)$$

That is, it is assumed that the maximum frequency "fmax" of the sound signal is 15 [KHz] and the frequency deviation "$\Delta f$" is 40 [KHz], the occupied bandwidth "B" is 100 [KHz] in accordance with the equation (1).

On the other hand, the frequency deviation is a width which the fundamental wave of the tone signal S1 of 32 [KHz] is deviated. The deviated width is a size of a tone, that is, volume.

Therefore, if the frequency deviation of the tone signal S1 is too large, it may exceeds the occupied bandwidth of the carrier wave, so that it can not be too large. On the contrary, if the frequency deviation of the tone signal S1 is too small, the tone signal S1 is mixed by a noise occurred during the spatial-transmitting, so that the tone signal S1 can not be distinguished on the receiver.

So, certain extent of the frequency deviation is necessary. In the case of the present invention, the tone signal S1 of 32 [KHz], which is within the occupied bandwidth of the carrier wave and which does not contain the frequency of the audio frequency band, is used with predetermined frequency deviation.

By the way, since the receiver detects the tone signal S1 to control the squelch circuit, when the microphone 10 sends the tone signal S1 superimposed on the carrier wave and then the receiver receives the carrier wave, the receiver judges whether the tone signal S1 of 32 [KHz] is superimposed on the carrier wave. At this time, if the receiver judges that the tone signal S1 of 32 [KHz] is not superimposed on the carrier wave, a sound is not output from a speaker. If the receiver judges that the tone signal S1 of 32 [KHz] is superimposed on the carrier wave, the sound is output from the speaker.

On the other hand, the low-frequency amplifier 16 amplifies the tone signal S1 so that an amplitude level of the tone signal S1 becomes higher than that of predetermined threshold voltage used to judge at the received side whether the tone signal S1 is superimposed on the carrier wave, and outputs it as the tone signal S2 to an inverter 17. Thereby the low-frequency amplifier 16 can amplify the tone signal S1 so that the amplitude level (frequency deviation according to high-frequency) of the tone signal S1 does not become lower than the threshold voltage.

The inverter 17 being a frequency deviation stabilizing means wave-shapes the tone signal S2 amplified to the amplitude level higher than predetermined threshold voltage, so as to stabilizes the amplitude level (frequency deviation) of the tone signal S2, and outputs it as a tone signal S3 to a low-pass filter 18.

The low-pass filter 18 eliminates higher harmonic of the tone signal S3 to suppress higher harmonic distortion and then outputs it as the stabilized tone signal S4 of constant amplitude of 32 [KHz] to a low-frequency mixer 19 being a mixing means.

By the way, the microphone 20 being the sound electric signal converting means converts a sound into a electric signal and then outputs it to the low-frequency amplifier 21 as an audio signal S5. The low-frequency amplifier 21 amplifies the audio signal S5 to predetermined level to output it to the low-frequency mixer 19 as a low frequency signal S6.

The low-frequency mixer 19 mixes the tone signal S4 of 32 [KHz] and the low frequency signal S6 to output it to a modulator 22 as a low frequency signal S7. The modulator 22 FM-modulates the carrier wave with the low frequency signal S7 to output it to a high-frequency amplifier 23 as a high frequency signal S8. The high-frequency amplifier 23 amplitudes the high frequency signal S8 to predetermined level to output it to the outside the equipment via an antenna 24 as electric wave.

In the above construction, in the microphone, the low-frequency mixer 19 mixes the tone signal S4 of 32 [KHz] stabilized with predetermined frequency deviation by the tone signal generating section 13 and the low frequency signal S6, and then the mixed signal is output via the modulator 22, the high-frequency amplifier 23 and the antenna 24, thereby the oscillation frequency of the tone signal S1 to be superimposed on the carrier wave can be kept within the occupied bandwidth of the carrier wave.

Figure 3:
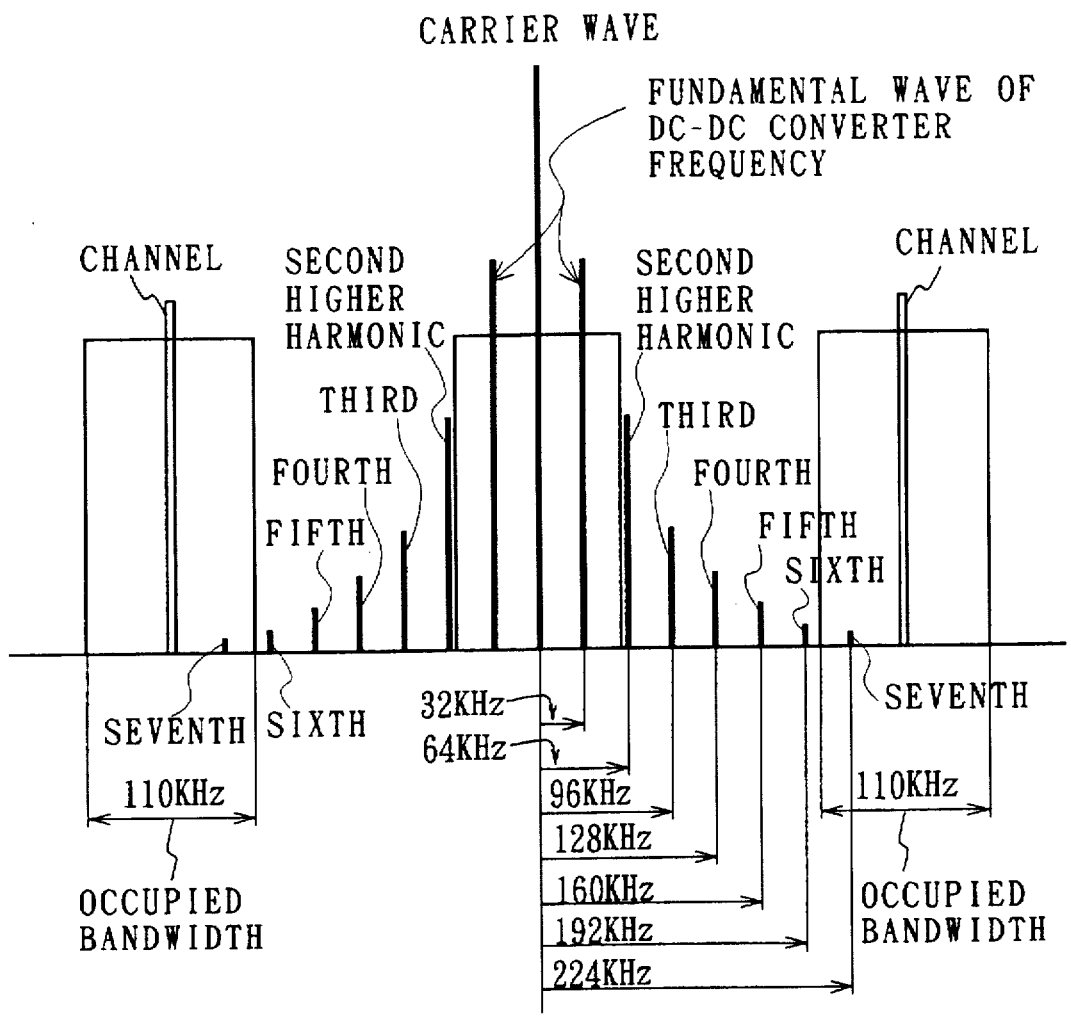
FIG. 3 is a schematic diagram showing the relation between carrier wave and higher harmonic.

Therefore, as shown in FIG. 3, in the case where the fundamental wave of the converter frequency of 32 [KHz] is superimposed on the carrier wave, as it becomes to second higher harmonic (64 [KHz]), third higher harmonic (96 [KHz]), . . . , sixth higher harmonic (192 [KHz]), and seventh higher harmonic (224 [KHz]), the level of the higher harmonic becomes low, so that the seventh higher harmonic is in the occupied bandwidth of the adjacent channels. However, the level is extremely low.

Thereby, in the microphone 10, the seventh harmonic does not have an effect on the adjacent channels, and also it can not be prevented from occurring as interference radiowave on the receiver.

Further, in the microphone 10, the DC—DC converter with the external clock input 15 receives the tone signal S1 which is used as a clock from the tone signal generating circuit 14, thereby the oscillation frequency of the oscillation section of each block (for example, such as CPU clock signal or LCD oscillation) is synchronized with the oscillation frequency of the tone signal S1. Thus the interference does not occur in the microphone 10 because the oscillation frequency of other oscillation section is synchronized with the oscillation frequency of the tone signal S1, as a result, the occurrence of beat can be suppressed.

Further, the microphone 10 uses the tone signal S1 of 32 [KHz] as a clock to generate the power supply output of predetermined voltage to be supplied to each block. Thus a filter for reducing the high frequency component superimposed on the power supply line is unnecessary, differing from the case where the power supply output of predetermined voltage is generated with the oscillation frequency of 100 [KHz] by the internal oscillation circuit according to the prior art.

Further, in the microphone 10, the DC—DC converter with external clock input 15 uses the tone signal S1 of 32 [KHz] which is supplied from the external tone signal generating circuit 14 as a clock, thus the circuit construction can be simplified.

Further, in the microphone 10, the frequency 32 [KHz] of the fundamental wave which is oscillated from the DC—DC converter with external clock input 15 is kept in the occupied bandwidth of the carrier wave containing the frequency deviation, and also does not contain the frequency of the audio frequency band, thus the frequency does not have an effect on the adjacent channels and persons do not hear as a noise.

Further, the low-frequency amplifier 16 in the tone signal generating section 13 amplifies the tone signal S1 to the amplitude level which is higher than predetermined threshold voltage to generate the tone signal S2, and then the inverter 17 stabilizes the amplitude level of the tone signal S2 to generate the tone signal S3. Thus, the frequency deviation of the tone signal S3 can be stabilized. Further, the low-pass filter 18 eliminates the high frequency component of the tone signal S3 to make the tone signal S4 which approaches a sine wave. In the microphone 10, the tone signal S4 which approaches the sine wave is mixed with the low frequency signal S6 obtained via the microphone 20, thereby the higher harmonic distortion of a low frequency signal S7 can be suppressed.

According to the aforementioned construction, in the microphone 10, the DC—DC converter with external clock input 15 uses the tone signal S1 of predetermined frequency deviation as a clock with 32 [KHz] such as not to extend across the occupied bandwidth of the carrier wave, thereby even if the fundamental wave of the tone signal S1 is superimposed on the carrier wave, the level of the multi-higher harmonic becomes extremely low, thus the adjacent channels can not be influenced. That is, in the microphone 10, the transmitter which has a simple construction and which can reduce unnecessary radiation can be realized.

Note that, in the aforementioned embodiment, the oscillation frequency of the tone signal S1 from the tone signal generating circuit 14 is set to 32 [KHz], however, the present invention is not limited thereto and the tone signal S1 of various oscillation frequency such as 31 [KHz], 33 [KHz], or 34 [KHz] can be used as long as it does not contain the frequency of the audio frequency band and is kept within the occupied bandwidth of the carrier wave containing the frequency deviation. Also in this case, the same effects as the aforementioned embodiment can be obtained.

Further, in the aforementioned embodiment, FIG. 2 is shown as the construction of the microphone 10, however, the present invention is not limited thereto and the microphone can have various constructions as long as the tone signal S1 from the tone signal generating circuit 14 is supplied to the DC—DC converter with external clock input 15 and the oscillation frequency of the tone signal S1 is kept in the occupied bandwidth of the carrier wave with the frequency deviation.

Further, the present invention is applied to the microphone 10 having FM modulation scheme as a transmitter, however, the present invention is not limited thereto and it can be applied to a transmitter which transmits on PM modulation scheme.

Furthermore, the present invention is applied to a portable microphone 10 as a transmitter, however, the present invention is not limited thereto and it can be applied to various transmitters such as a transceiver.

As described above, according to the present invention, a transmitter comprises: a power supply output generating means for generating a power supply output of predetermined voltage on the basis of an output of a power supply unit; a tone signal generating means for operating according to the output of the power supply unit and generating a tone signal; a sound electric signal converting means for converting a sound into an electric signal; a mixing means for mixing the sound signal obtained by the sound electric signal converting means and the tone signal; a modulating means for modulating a carrier wave with a low frequency signal consisting of the sound signal and the tone signal which are mixed by the mixing means; and a transmitting means for transmitting the modulated wave signal modulated by the modulating means in the electric wave, and wherein the tone signal generating means generates a tone signal having predetermined frequency and predetermined frequency deviation such as not to extend across predetermined frequency bandwidth of the carrier wave, and the voltage generating means generates the power supply output of predetermined voltage on the basis of the output of the power supply unit by using the tone signal as a clock.

Thus, by using the tone signal of predetermined frequency and predetermined frequency such as not to extend across predetermined occupied bandwidth according to the tone signal generating means as a clock of the power supply output generating means, the transmitter can own the tone signal generating means jointly, and also even if the frequency component of the tone signal is superimposed on the carrier wave, the transmitter which can reduce unnecessary radiation without an effect on adjacent channels for the reason that the level of multi-higher harmonic component is extremely low can be realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A transmitter, comprising:

power supply output generating means for generating a power supply output of predetermined voltage on the basis of an output of a power supply unit;

tone signal generating means for operating according to said output of said power supply unit and generating a tone signal;

sound electric signal converting means for converting a sound into an electric signal;

mixing means for mixing the sound signal obtained by said sound electric signal converting means and said tone signal;

modulating means for modulating a carrier wave with a low frequency signal consisting of said sound signal and said tone signal which are mixed by said mixing means; and transmitting means for transmitting modulated wave signal modulated by said modulating means in an electric wave, and wherein:

said tone signal generating means generates said tone signal having predetermined frequency and predetermined frequency deviation such as not to extend across predetermined frequency bandwidth of said carrier wave; and said power supply output generating means generates said power supply output of said predetermined voltage on the basis of said output of said power supply unit by using said tone signal as a clock.

2. The transmitter according to claim 1, wherein said tone signal generating means has a frequency deviation stabilizing means for stabilizing said frequency deviation.

3. The transmitter according to claim 1, wherein said tone signal does not contain the frequency of audio frequency band.

* * * * *